Sept. 30, 1969
R. C. MAIQUES
3,469,348
COMPOUND GLASS FOR WINDOWS
Filed March 16, 1967
2 Sheets-Sheet 1
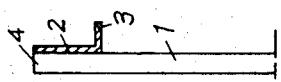
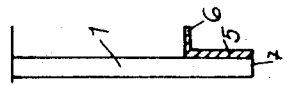
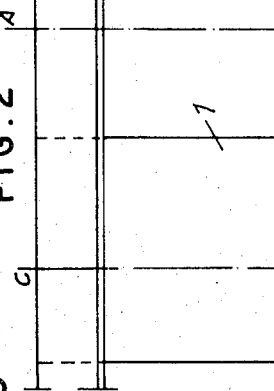
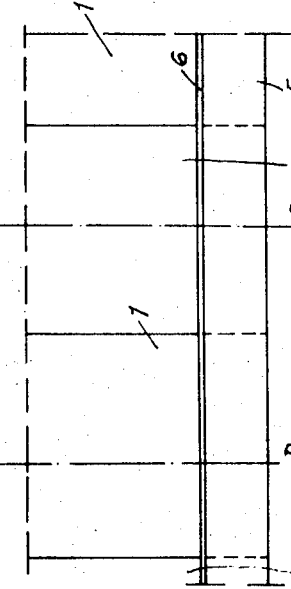
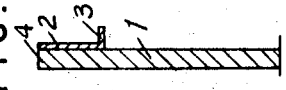
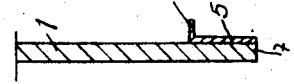
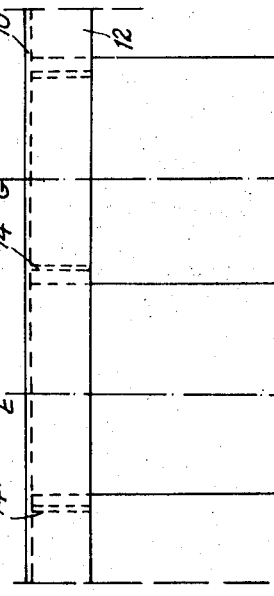
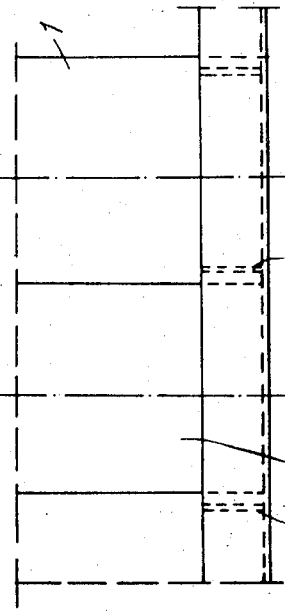
INVENTOR
RICARDO C. MAIQUES
BY Richards & Geier
ATTORNEYS

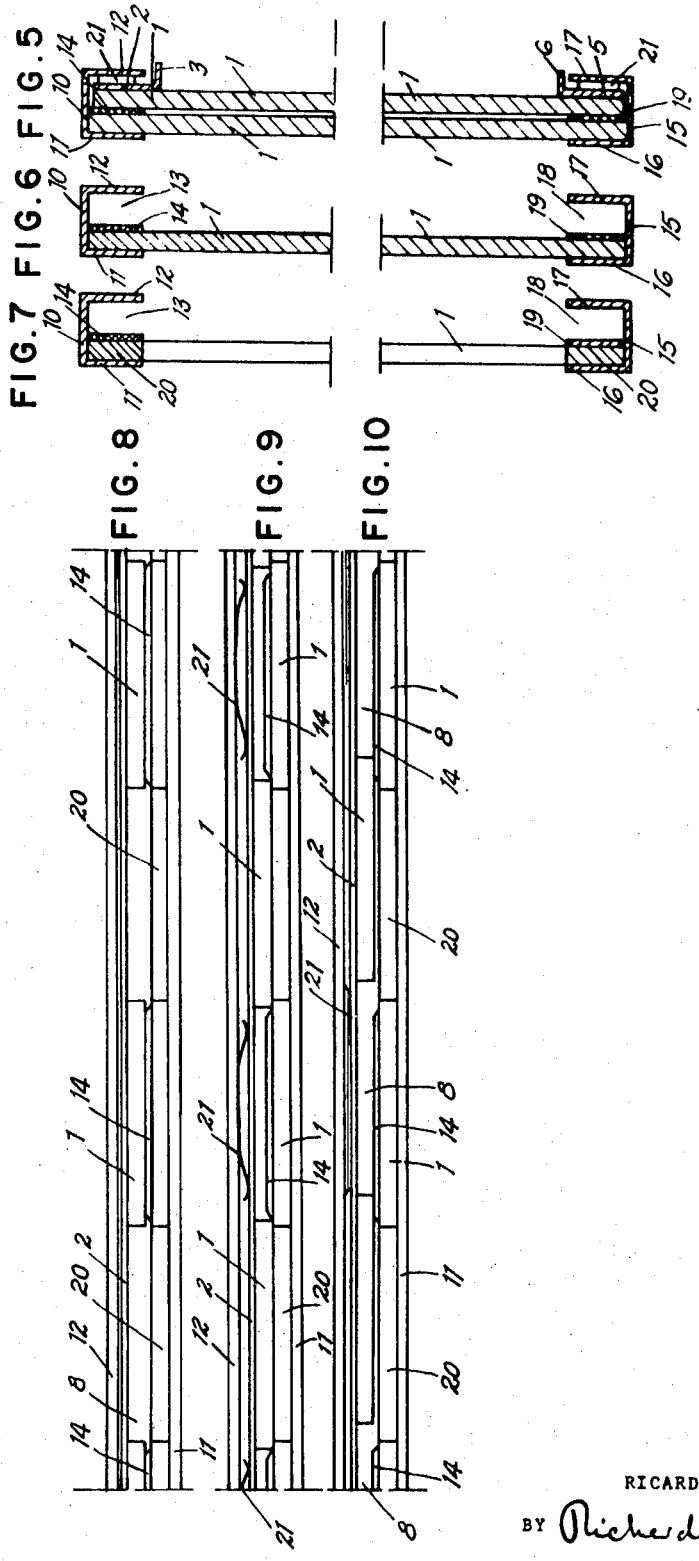

3,469,348
COMPOUND GLASS FOR WINDOWS
Ricardo Camilleri Maiques, Avenida de Roma No. 155,
Barcelona, Spain
Filed Mar. 16, 1967, Ser. No. 623,580
Int. Cl. E06b 3/00, 5/00
U.S. Cl. 49—413                                           1 Claim

ABSTRACT OF THE DISCLOSURE

A window glass includes a static element which can be fixed to the frame of a window and a movable element. Both elements consist of a plurality of spaced rectangular pieces of glass of the same size. The static element has top and bottom edges covered by U-shaped metal guides. The top and bottom edges of the movable element carry L-shaped guides and fit into the U-shaped guides of the static element. The open spaces between the glass pieces have a smaller width than the width of the glass pieces.

---

This invention refers to a compound glass for windows of the type which includes two juxtaposed glass elements, one static and the other gliding, both pieces of glass having a large number of transversal open fretwork, these all being equal among each other. When they are moved one on top of the other, said open works are confronted completely or partially, in order to let the air pass through, or said open works are opposed and then do not let any air pass through.

The object of the invention is a window glass which is composed of two juxtaposed elements, a static one and a gliding one which can be slid on the first one, in which the gliding element is connected in some lateral guides fixed to the static element.

Another object of the invention is a window glass composed of two juxtaposed elements, a static one and another one gliding on the first one, in which each element is formed by some pieces of glass and all of them are equal among themselves and of rectangular outlines which are fixed by their smaller and opposed sides in some metallic profiles which have a U-section belonging to the static element and an L-section belonging to the sliding element.

There is still another object of the invention which is a window glass composed of two juxtaposed elements and constituted as it has been indicated, in which the profiles with the section L of the element are gliding, they are placed within the profiles with the section U of the static element, interposing between them an elastic means which stops the movements of the gliding element, so that this one may be placed at any possible position with regards to the static element and, so that it would remain in said position without moving by itself.

Another object of the invention is a window glass composed of two juxtaposed elements, a static one and the other one gliding on the first one, in which the rectangular pieces of glass are fixed to the corresponding profiles with less separation than the width of said pieces of glass, these also being fixed to said profiles between each piece of glass and the adjacent piece, some narrow pieces which only cover the width of the wing of the profile without standing out of the same.

Another object of the invention is also a window glass composed of two juxtaposed elements, a static one and the other one gliding on it, in which, on the minor sides of the pieces of glass which are forming the static element, some thin plates must be fixed with their extreme bevelings and, on which the lateral edges of the rectangular pieces are supported and are gliding which form the gliding element, so that, on carrying out the action of the elastical means, they would be slightly separated from the pieces of glass of the static element and, so that there would not be any friction produced among the pieces of glass of the gliding element with the static elements and, furthermore, they establish the position of a complete closing, which means in other words, that position, in which the rectangular pieces of the gliding element remain put over each other in the holes which separate each two rectangular adjacent pieces of the static element.

In this way, my invention is mainly characterized by manufacturing each one of the two elements, which, on being juxtaposed, form the set-up by means of rectangular pieces, all these being the same among themselves and which are cut in glass or any other appropriate material and, which, on each minor side, are fixed and are placed at a certain distance from each other in a dimension always being less than their width in two metallic profiles, one on each side, and which, at the same time, adjust each element, thus forming the transversal fretwork; they also form the guides or rails which make the mutual installation of both elements possible, as well as the movement of the mobile element which is juxtaposed on the static element.

It is another characteristic of the same invention that, in order to constitute the mobile element, an L-shaped profile is fixed on each area next to the minor lateral part of each one of the rectangular pieces, fastened by one of its wings or sides, the other wing or side remaining perpendicular to the piece of glass and parallel to the lateral edge of the element, these profiles thus constituting the means of union of the rectangular pieces which form said gliding element and, at the same time, the wings which have remained perpendicular to the rectangular pieces; these act as guides and do not allow the elastic means to come out of their place and, which restrain both elements between each other.

It is also a characteristic of the same invention that, to determine the position in which each rectangular piece must be fixed, some crevices or partial cuts are produced in the appropriate places of the wing of the L-shaped profile which come out of the inferior face and are used as the point of support of the edges of the rectangular piece; in this way, on working said mobile element by the handle which is fixed in the centre of one of the rectangular pieces, the effort is exercised on the top produced by the handle and not on the adjusting sticking material.

At the same time, this invention is characterized by the profiles, on which the rectangular pieces are fixed to form the static element and these being in U form of equal branches and with a larger inner width than the double measurement of the thickness of said rectangular pieces, the joining of these pieces being produced on the same inner face of one of the branches of the profile; the purpose of this is that the other branches remain in a position parallel to the set-up of the element and, in order to serve as a guide to receive the coupling of the mobile element, being fixed on the same inner side of the branch of the profile, between each rectangular piece and the adjacent one, separating each one and, preferably, cut of the same material and always with one and the same thickness; this has the purpose that every branch of the profile would be covered by pieces and by separators and, so that they would practically not have any continuity, as it is precisely on these parts where the lateral areas of the mobile element have to glide.

It is another characteristic of the same invention that, on each minor lateral area of each one of those rectangular pieces which form the static element, some thin plates are fixed, preferably metallic ones, with the extreme parts bevelled and, with a length somewhat less than the separation between two rectangular adjacent pieces; all this is carried out in such a way that, on juxtaposing both elements, there will be a superficial contact of the pieces which form one element with those forming the other one, only when they are opposed; this means, when the pieces of the mobile element are covering the spaces which separate the pieces from the static element and, on moving the mobile element, the edges of the pieces forming it are gliding first over the bevelings of the above mentioned plates, losing the superficial contact of the rectangular pieces of one element with the ones of the other one and, in this way, a friction is avoided and, at the same time, establishing the position of closing.

At last it is a characteristic of the same invention that, between the outer face of the wing of the L-shaped profile which form the sides of the mobile element and the inner face of the free branches of the profiles in U of the static element, some plated resorts are installed as elastic means which tend to permanently maintain the contact with both elements; this contact and the presence of the bevelled plates is produced only on the lateral areas on the above mentioned plates during the entire possible movement of the mobile element, except when it is in the position of complete closing.

These objects and characteristics can be seen clearer and with more details, following the description of the figures of the enclosed drawing sheet which represent diverse views of a static element, a gliding element, and an already mounted set-up which is apt to substitute the simple window glasses with a great advantage.

FIGURE 1 shows a view of the mobile element, according to line A—B of FIGURE 2 which represents it in plan view; showing the same mobile element in FIGURE 3 is seen in section, according to line C—D of the same FIGURE 2; FIGURE 4 represents the static element seen in plan view. In FIGURE 5, in section, the set-up of both elements is represented; said set-up is represented in FIGURE 6, in section along line E—F of of FIGURE 4 and, in FIGURE 7, in section along line G—H of the same FIGURE 4; at last, the FIGURES 8, 9 and 10 represent the same mounted set-up respectively, seen in section, through a longitudinal lateral plan in the position of a complete opening; complete closing and the beginning of an opening position.

Said figures show the rectangular piece cut in glass 1, on which, in one of its minor lateral areas the angular metallic profile in L is fixed 2, with its wing 3 not coinciding with the edge 4, with which the extreme part of the wing 2 is coinciding, as it is shown.

In the other minor lateral area of the same piece, the other angular profile in L is fixed 5 by one of its wings which coincides with the edge 7 of the plate 1, leaving the other wing 6 like wing 3 of 2, perpendicular to the larger face of the rectangular piece 1 and put at a certain distance from its edge 7. In this way, said wings 3 and 6 act closing the space, in which the spring is installed afterwards and, the larger wings 5 and 2 serve as a support of said spring, besides supporting the rectangular pieces 1 and, therefore mounting the gliding element.

The rectangular pieces 1 are fixed in said parallel profiles between one another, but each one put at a certain distance from the adjacent part with less dimension than its own width and, thus, the set-up of the element, as shown in FIGURE 2, presents the parts closed by means of the piece 1, as well as the open parts 8.

The static element, see FIGURES 4, 6 and 7, is also constituted by means of rectangular pieces of glass 1, equal to the ones mentioned, and leaving the space free between each two adjacent parts 9 with the same width as width 8 of the mobile element. These pieces are fixed on by their smaller sides on the inner face of the wing 11 of the U-shaped profile 10, thus leaving between this piece and the other wing 12 of the profile, the open space 13, in which the mobile element is installed afterwards and, the metallic plate 14 is fixed on the lateral area of the piece of glass, the thickness of which is about 0.1 mm. The other smaller side of these same pieces 1 is fixed on the inside of the wing 16 of the U-shaped profile 15, thus providing room for the three space 18 between the piece of glass and the other wing 17 which, together with space 13 constitute the guides or rails for the mobile element of the FIGURES 1 to 4, as it is presented in FIGURE 5, also endowing themselves to said smaller side of the metallic plate 19, similar to plate 14 and of the same length and of the same thickness. On the inner faces of said wings 11 and 16, see FIGURE 7, the long narrow strips of glass 20 are fixed which are of the same thickness as the pieces 1 and, in this way, they can be used as separators of said pieces 1 to communicate a continuity of surface to the guides, as the edges of the mobile element have to be supported by them.

On installing said mobile element within the lateral guides of the static element, the springs 21 are installed between parts 2 and 5 and between parts 12 and 17 which permanently tend to maintain the mobile element applied against the static element or against its plates 14 and 19, as it is shown in FIGURE 8, which means, when the set-up is in the position of "open," in which coincide the open fretwork 9 of the static element confronted with part 8 of the mobile element. On the contrary, when they are in the position of complete closing, see FIGURE 9, each piece 1 of the mobile element remain supported directly on the edges of the two adjacent pieces 1 of the static element and, in this way, these pieces are covering the open fretworks 8 of the mobile element.

On changing this position to any other possible position, as it is represented in FIGURE 10, the pieces 1 of the mobile element run up on the metallic plates 14 and are separated at a small distance from the pieces 1 of the static element, and there is no friction among them during the entire possible run of the mobile element until it again is in the position of closing.

In any one of the pieces 1 of the mobile element and, in its central part, a handle is put on, in order to be able to change the position of said mobile element with regards to the static element and to assure that the piece 1, on which such a handle is placed (this has not been shown in the drawings) cannot come off the profile due to the effort exercised on the same; it has therefore been provided to produce some cuts in the wings 2 and 5 which come out of the inferior side, which means out of the face, on which the rectangular pieces are fixed and, in this way, they are a point for support for the larger lateral edges of said piece, although it is only natural that said tops can also be produced for each and every one of their pieces 1.

I claim:

1. A window glass comprising a static element and a movable element, each of said elements having spaced rectangular pieces of glass of the same size, the distance between two adjacent pieces of glass being less than the width of a piece of glass, separate U-shaped metal guides upon opposed edges of said static element, each of said U-shaped guides having a leg portion fixed to one surface of the static element adjacent the edge thereof, another leg portion extending at a distance from the opposite surface of the static element and a bottom portion joining the two leg portions, and a metal plate having bevelled ends and fixed to said opposite surface of the static element and located opposite said other leg portion, whereby a groove is formed by said metal plate, a part of said bottom portion and said other leg portion, strips of glass, each strip extending between the first-mentioned leg portion of a separate U-shaped guide and the opposed plate and joining adjacent rectangular pieces of glass, separate L-shaped metal guides upon opposed edges of said movable element, each of said L-shaped guides having a flat portion fixed upon a surface of the movable element adjacent the edge thereof and a wing extending perpendicularly to this surface at a distance from the edge, said movable element fitting into said U-shaped guides with the edges of the movable element being located in said grooves and said wings being spaced from said other leg portions, and laminar springs, each spring being located in a separate groove between the flat portion of an L-shaped guide and said other leg portion of a U-shaped guide and pressing said movable element against said static element.

References Cited

UNITED STATES PATENTS

| | | | |
|---|---|---|---|
| 2,250,059 | 7/1941 | Farney | 160—222 X |
| 3,289,738 | 12/1966 | Williams | 160—222 X |

FOREIGN PATENTS 866,026  3/1941  France.

DAVID J. WILLIAMOWSKY, Primary Examiner

J. K. BELL, Assistant Examiner

U.S. Cl. X.R.

52—207